(12) United States Patent
Ahn et al.

(10) Patent No.: US 11,820,215 B2
(45) Date of Patent: Nov. 21, 2023

(54) SYSTEM AND METHOD FOR CONTROLLING DISPLAY OF VEHICLE

(71) Applicant: HYUNDAI MOBIS Co., Ltd., Seoul (KR)

(72) Inventors: Sung Joon Ahn, Yongin-si (KR); Tae Hun Kim, Yongin-si (KR); Seung Hwan Lee, Yongin-si (KR); Myung Bin Choi, Seoul (KR); Won Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 249 days.

(21) Appl. No.: 17/088,296

(22) Filed: Nov. 3, 2020

(65) Prior Publication Data

US 2021/0129672 A1    May 6, 2021

(30) Foreign Application Priority Data

| Nov. 4, 2019 | (KR) | 10-2019-0139564 |
| Nov. 4, 2019 | (KR) | 10-2019-0139565 |
| Dec. 26, 2019 | (KR) | 10-2019-0175702 |

(51) Int. Cl.
  *B60K 35/00* (2006.01)

(52) U.S. Cl.
  CPC ...... *B60K 35/00* (2013.01); *B60K 2370/1438* (2019.05); *B60K 2370/1468* (2019.05); *B60K 2370/152* (2019.05); *B60K 2370/158* (2019.05)

(58) Field of Classification Search
  CPC ......... B60K 35/00; B60K 37/06; G06F 3/016; G06F 3/041; G06F 3/0488; G06F 3/167; G09B 21/007
  See application file for complete search history.

(56) References Cited

U.S. PATENT DOCUMENTS

| 8,957,867 B2 | 2/2015 | Dietz et al. | |
| 9,690,382 B1* | 6/2017 | Moussette | G06F 3/167 |
| 2011/0221703 A1* | 9/2011 | Dietz | G06F 3/016 345/173 |
| 2011/0261021 A1* | 10/2011 | Modarres | G06F 3/0414 345/177 |
| 2014/0098038 A1* | 4/2014 | Paek | G06F 1/1692 345/173 |

(Continued)

FOREIGN PATENT DOCUMENTS

| CN | 109643219 A | 4/2019 |
| WO | 2019/072512 A1 | 4/2019 |

OTHER PUBLICATIONS

Office Action dated Jun. 1, 2023 in corresponding Chinese patent application No. 202011216542.4.

*Primary Examiner* — Fred Tzeng
(74) *Attorney, Agent, or Firm* — NovoTechIP International PLLC

(57) ABSTRACT

Provided are a system and a method for controlling a display of a vehicle. The system for controlling a display of a vehicle includes an input part for receiving a touch input signal with respect to a touch operation region, a memory in which a haptic feedback provision program with respect to a touch input is stored, and a processor for executing the haptic feedback provision program, wherein the processor provides haptic feedback of a different feel for each touch operation region and for each function.

12 Claims, 19 Drawing Sheets

(56) References Cited

U.S. PATENT DOCUMENTS

| | | | |
|---|---|---|---|
| 2014/0101545 A1* | 4/2014 | Paek | G06F 3/0488 |
| | | | 715/702 |
| 2014/0281950 A1* | 9/2014 | White | G06F 3/016 |
| | | | 715/269 |
| 2016/0195931 A1* | 7/2016 | Czelnik | G06F 3/016 |
| | | | 345/173 |
| 2017/0220118 A1 | 8/2017 | Dabic et al. | |
| 2017/0282717 A1* | 10/2017 | Jang | B60H 1/00985 |
| 2018/0348865 A1* | 12/2018 | Czelnik | B60K 37/06 |
| 2019/0018490 A1* | 1/2019 | Ullrich | G06F 3/0488 |
| 2019/0212819 A1* | 7/2019 | Piao | G06F 3/041 |
| 2020/0026357 A1* | 1/2020 | Kirsch | G06F 3/016 |
| 2022/0121287 A1* | 4/2022 | Mani | G09B 21/007 |
| 2022/0291748 A1* | 9/2022 | Harazi | G06F 3/041 |

* cited by examiner

FIG. 5
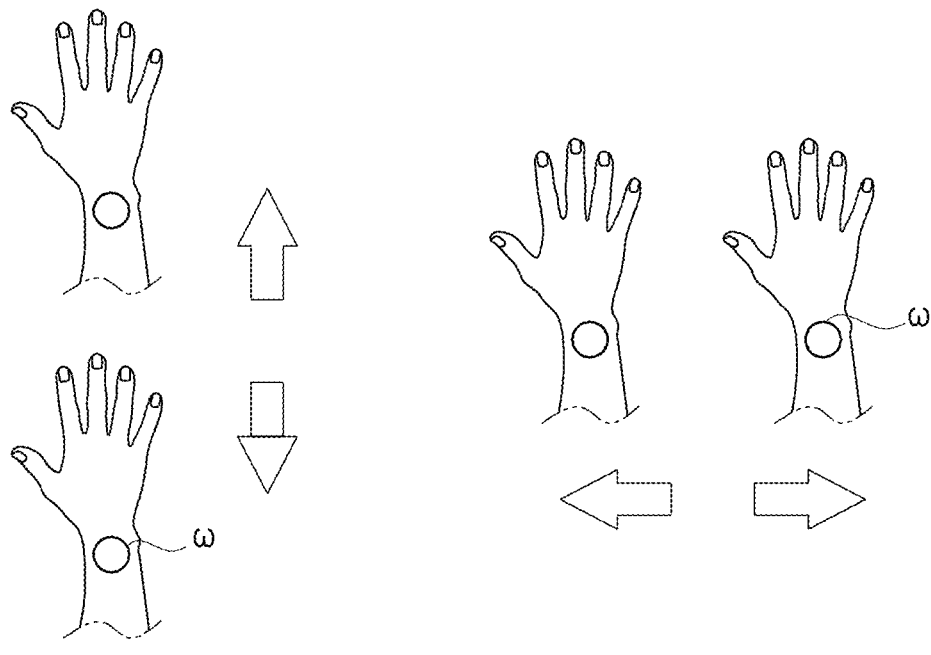
(A) (B)
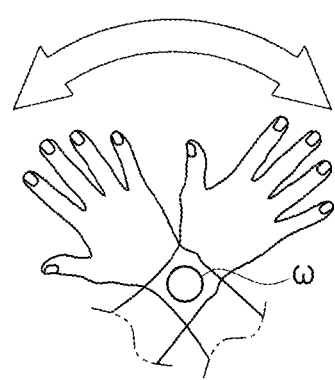
(C)

FIG. 21

| POSITION | ACC | INTEGRATED CONTROLLER MOVEMENT SIGNAL | STATUS | OPERATION |
|---|---|---|---|---|
| DRV | ON | DRV TO PASS | — | MOVE FROM DRV TO PASS |
| DRV | ON | PASS TO DRV | — | MAINTAIN POSITION OF DRV |
| DRV | OFF | DON'T CARE | — | MOVE FROM DRV TO PASS |
| PASS | ON | PASS TO DRV | — | MOVE FROM PASS TO DRV |
| PASS | ON | DRV TO PASS | — | MAINTAIN POSITION OF PASS |
| PASS | OFF | DON'T CARE | — | MAINTAIN POSITION OF PASS |
| DURING MOVEMENT FROM DRV TO PASS | ON | DRV TO PASS | — | MAINTAIN POSITION OF PASS AFTER MOVEMENT FROM DRV TO PASS IS COMPLETED |
| DURING MOVEMENT FROM DRV TO PASS | ON | PASS TO DRV | — | MAINTAIN POSITION OF PASS AFTER MOVEMENT FROM DRV TO PASS IS COMPLETED (NEGLECT SIGNAL DURING MOVEMENT) |
| DURING MOVEMENT FROM DRV TO PASS | ON | DON'T CARE | STALL | CHANGE DIRECTION AFTER STALL IS RECOGNIZED AND MAINTAIN POSITION AFTER DRV IS RETURNED |
| DURING MOVEMENT FROM DRV TO PASS | OFF | DON'T CARE | — | MAINTAIN POSITION OF PASS AFTER MOVEMENT FROM DRV TO PASS IS COMPLETED |
| DURING MOVEMENT FROM PASS TO DRV | ON | PASS TO DRV | — | MAINTAIN POSITION OF DRV AFTER MOVEMENT FROM PASS TO DRV IS COMPLETED |
| DURING MOVEMENT FROM PASS TO DRV | ON | DRV TO PASS | — | MAINTAIN POSITION OF DRV AFTER MOVEMENT FROM PASS TO DRV IS COMPLETED (NEGLECT SIGNAL DURING MOVEMENT) |
| DURING MOVEMENT FROM PASS TO DRV | ON | DON'T CARE | STALL | CHANGE DIRECTION AFTER STALL IS RECOGNIZED AND MAINTAIN POSITION AFTER PASS IS RETURNED |
| DURING MOVEMENT FROM PASS TO DRV | OFF | DON'T CARE | — | MAINTAIN POSITION OF PASS AFTER MOVEMENT FROM DRV TO PASS IS COMPLETED |

SYSTEM AND METHOD FOR CONTROLLING DISPLAY OF VEHICLE

CROSS-REFERENCE TO RELATED APPLICATION

This application claims priority to and the benefit of Korean Patent Application Nos. 10-2019-0139565 and 10-2019-0139564, filed on Nov. 4, 2019, and Korean Patent Application No. 10-2019-0175702 filed on Dec. 26, 2019, the disclosures of which are incorporated herein by reference in its entirety.

BACKGROUND

1. Field of the Invention

The present invention relates to a system and a method for controlling a display of a vehicle.

2. Discussion of Related Art

According to the related art, touch haptic devices have been proposed to control a vehicle display device.

However, the touch haptic device merely provides haptic feedback as feedback on whether a touch is input, and thus the touch haptic device has a limitation of not providing the haptic feedback for each segmented display area or each function.

According to the related art, a technology has been proposed that includes a vehicle display device and provides contents according to a user's selection or a driving situation.

However, the related art merely proposes a form in which a vehicle display device is fixedly disposed in front of a driver's seat and a passenger's seat, so there is a limitation in providing a service.

SUMMARY OF THE INVENTION

The present invention is directed to providing a system and a method for controlling a display of a vehicle, which provide different haptic feelings for each display area and each function which become targets to be controlled in a touch operation system to allow a driver to intuitively recognize the different haptic feelings.

According to an aspect of the present invention, there is provided a system for controlling a display of a vehicle which includes an input part for receiving a touch input signal with respect to a touch operation region, a memory in which a haptic feedback provision program with respect to a touch input is stored, and a processor for executing the haptic feedback provision program, wherein the processor provides haptic feedback of a different feeling for each touch operation region and for each function.

The processor may provide the haptic feedback of a different feel by adjusting a frequency and strength of a vibration.

The processor may provide the haptic feedback on a three-dimensional operation feeling at a disconnection which segments a region.

In response to a region change in an in-vehicle display according to movement of the in-vehicle display, the processor may change a segment in the touch operation region and provide different haptic feedback for each changed region.

The processor may provide haptic feedback of a corresponding preset feel with respect to a preselected function mode.

The processor may analyze touch input information of a user and provide the haptic feedback according to a determination result of an operation intent of a user.

According to another aspect of the present invention, there is provided a method of controlling a display of a vehicle, which includes (a) receiving a touch input signal with respect to a user's touch operation region for vehicle display control, and (b) in response to the touch input signal, providing haptic feedback of a different feel for each touch operation region and each function.

In operation (b), a frequency and strength of a vibration may be adjusted to provide the haptic feedback.

In operation (b), when a drag input is received from the touch operation region to other regions, or a drag input is received between other regions, haptic feedback of a three-dimensional operation feeling may be provided at a disconnection between the regions.

In operation (b), when a first mode is set, haptic feedback of a preset feel corresponding to a preselected function mode is provided, and, when a second mode is set, haptic feedback with respect to a function, which corresponds to an intent of the user determined according to an analysis result of a touch input form of the user, may be provided.

In operation (b), the haptic feedback of the different feel for each touch operation region may be provided to correspond to an operation region of a system which is a target to be controlled.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 5 shows an operation concept for moving a display according to an embodiment of the present invention;

FIG. 21 is a diagram in which an operation scenario of the vehicle display device according to yet another embodiment of the present invention is schematically summarized.

DETAILED DESCRIPTION OF EXEMPLARY EMBODIMENTS

The above-described objectives and other objectives, advantages, and features of the present invention and the manner for achieving the same will become apparent with reference to the embodiments described in detail below with the accompanying drawings.

However, the present invention is not limited to the embodiments disclosed below and may be implemented in many different forms, the following embodiments are merely provided to allow those skilled in the art to which the present invention pertains to easily understand the objectives, configurations, and effects of the present invention, and the scope of the present invention is defined by the appended claims.

Meanwhile, terms used herein are intended to describe the embodiments and are not intended to limit the present invention. In this disclosure, the singular forms include the plural forms unless the context clearly dictates otherwise. It is noted that the terms "comprises" and/or "comprising" used herein does not exclude the presence or addition of one or more other components, steps, operations, and/or elements in addition to stated components, steps, operations, and/or elements.

Figure 1:
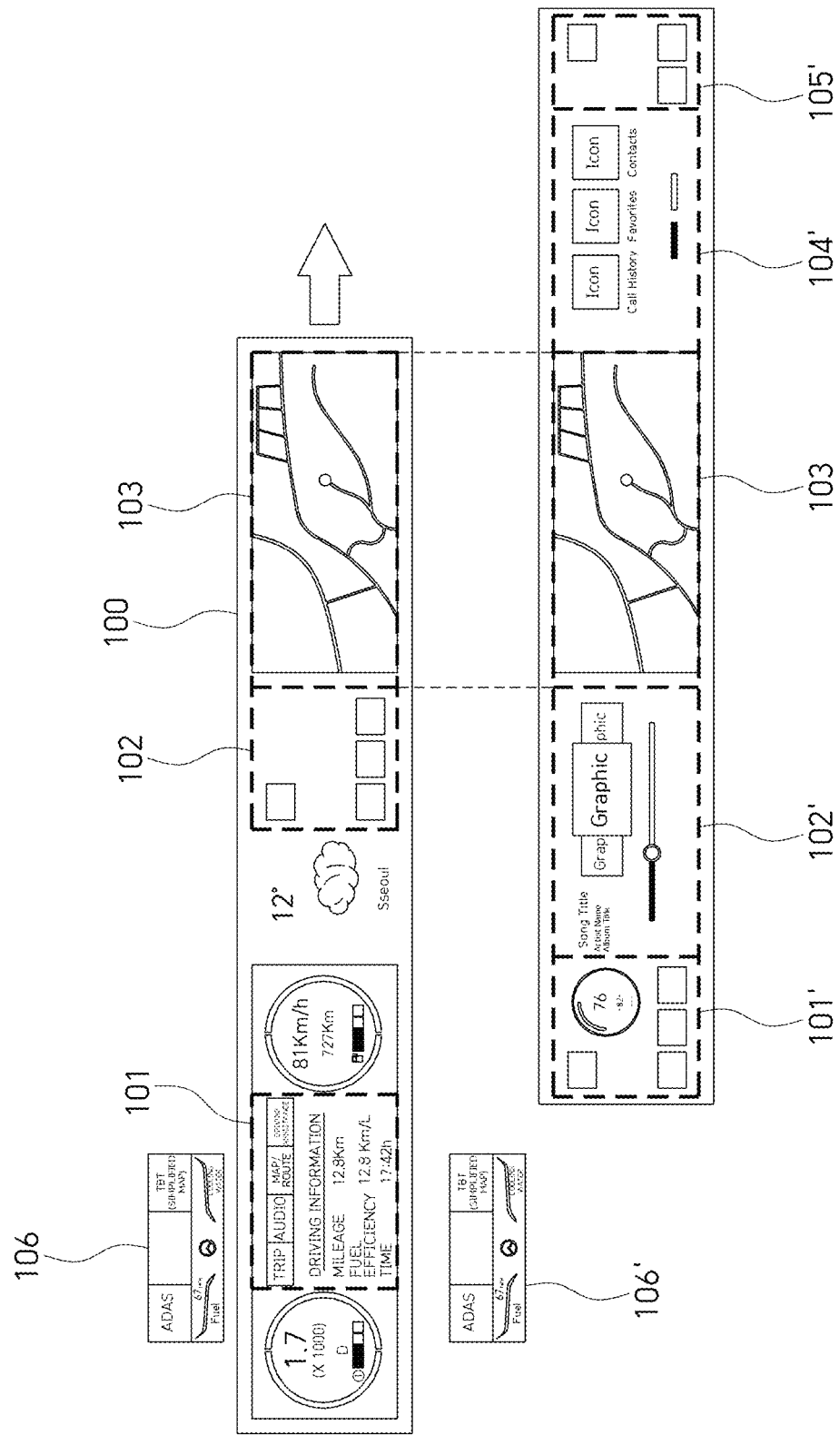
FIG. 1 shows a screen change structure due to movement of a large-screen display device according to an embodiment of the present invention.

Referring to FIG. 1, an in-vehicle display (large-screen display) 100 is moved in a direction from a driver's seat to a passenger seat.

Before the movement, a region of the in-vehicle display 100 is in a state of being segmented into four regions 101, 102, 103, and 106 including a head-up display (HUD), and in the passenger seat after the movement, the region of the in-vehicle display 100 is in a state of being segmented into six regions 101', 102', 103, 104', 105', and 106' including the HUD.

Before the movement, an operation system 200, which will be described below with reference to FIG. 3, allows movement between the regions 101 to 106. When a movement command from a current region 103 to a right side or from a current region 101 to a left side is received, the operation system 200 provides a focus and activation function with respect to the HUD region 106.

In addition, after the movement, the operation system 200 allows movement between the regions 101' to 106'. When a movement command from a current region 105' to a right side or from a current region 101' to a left side is received, the operation system 200 provides a focus and activation function with respect to the HUD region 106'.

As the in-vehicle display 100 is moved from the driver's seat to the passenger seat, the number of display regions is increased and contents displayed in each display region are changed.

For example, a revolution per minute (RPM), driving information (mileage, fuel efficiency, and a time), and speedometer information are displayed in the region 101, and in response to the movement, the region 101' displays driving-related information (speedometer information) in the form of a relatively simplified icon.

The region 103 is a region in which navigation information is displayed. In spite of the movement of the in-vehicle display 100, a screen region with respect to a preset navigation function is maintained as the same display region based on a position of a driver.

It is preferable that some screens are maintained at mechanical positions, and a background image (video) and a display are moved according to a movement speed of the in-vehicle display 100.

According to an embodiment of the present invention, driving information (a driving speed and the like) displayed in a cluster region is moved to the HUD region 106 and then displayed in the HUD region 106 according to the movement of the in-vehicle display 100.

This is because, as the in-vehicle display 100 is moved, since an area of the region 101 corresponding to the cluster area is decreased to the region 101', and the number of displayable icons or an amount of information provision is decreased, the driving information is moved to the HUD region 106 and then displayed in the HUD region 106.

Figure 2:
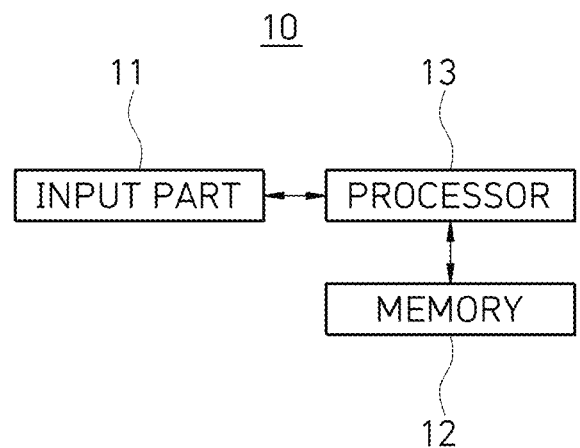
FIG. 2 is a block diagram illustrating a system for controlling a display of a vehicle according to an embodiment of the present invention.

FIG. 2 is a block diagram illustrating a system for controlling a display of a vehicle according to an embodiment of the present invention.

A vehicle display control system 10 according to the present invention includes an input part 11 for receiving a touch input signal with respect to a touch operation region, a memory 12 in which a program for providing haptic feedback in response to a touch input signal is stored, and a processor 13 for executing the program for providing haptic feedback, and the processor 13 provides haptic feedback of different feels with respect to each touch operation region and each function.

The processor 13 provides haptic feedback of different feels by adjusting a frequency and strength of a vibration.

The processor 13 provides haptic feedback on a three-dimensional operation feeling at a disconnection which segments a region.

In response to a region change in the in-vehicle display 100 according to the movement of the in-vehicle display 100, the processor 13 changes a segment in the touch operation region and provides different haptic feedback for each changed region.

The processor 13 provides haptic feedback of a corresponding preset feel with respect to a preselected function mode.

The processor 13 analyzes touch input information of a user and provides haptic feedback according to a determination result of an operation intent of the user.

Figure 3:
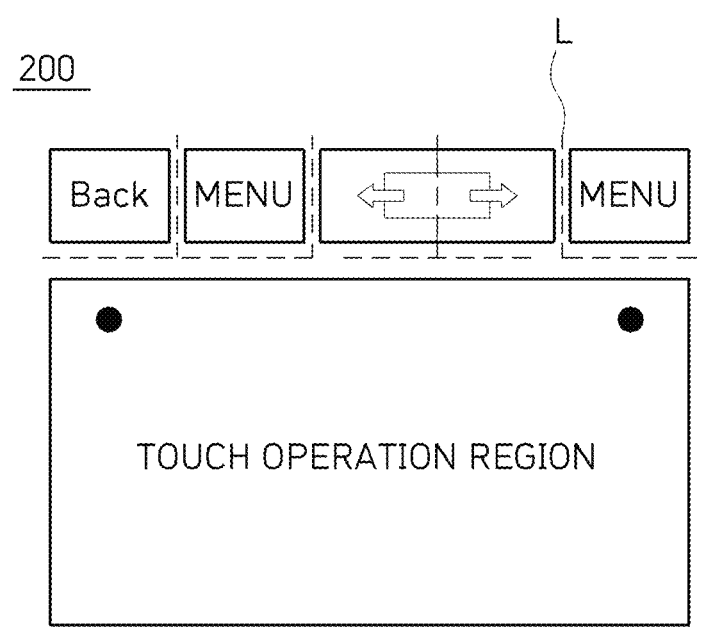
FIG. 3 shows an operation system of the system for controlling a display of a vehicle according to the embodiment of the present invention.

FIG. 3 shows an operation system for providing haptic feedback with respect to a vehicle display control according to an embodiment of the present invention.

Figure 4:
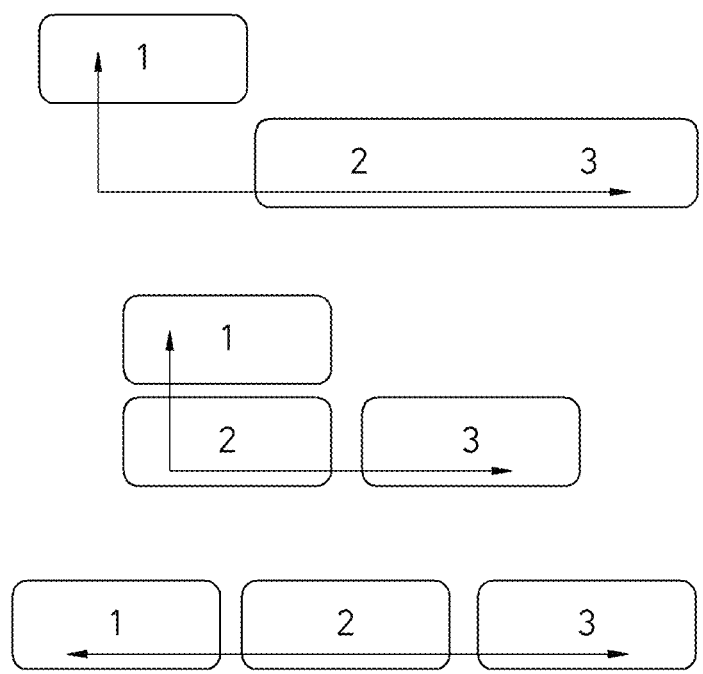
FIG. 4 shows an example of a display form according to an embodiment of the present invention.

Referring to FIG. 3, the operation system 200 includes a touch operation region including hot keys (a hot key of an upper end of a left side of the touch operation region is moved to a frontmost region 1 of FIG. 4, and a hot key of an upper end of a right side of the touch operation region is moved to a rearmost region 3), a back region, a menu region, a movement region, and a voice recognition region which are provided in an upper portion of the operation system 200.

The operation system 200 provides feel haptic feedback in response to a touch operation of the user performed in the touch operation region. Specifically, the operation system 200 provides haptic feedback which is discriminable as a different feel with respect to a focus movement, handwriting recognition, and scrolling.

The operation system 200 provides the haptic feedback which is discriminable as a different feel by adjusting a frequency and strength.

In consideration of a road surface vibration according to a driving situation, the operation system 200 changes a manner of providing the haptic feedback.

For example, when a vehicle is traveling in a section in which a road surface vibration is relatively strong, the operation system 200 controls a frequency and strength of haptic feedback to allow the driver to feel the haptic feedback that is resilient against the road surface vibration.

The user may recognize what function is currently operated through a tactile sense in advance so that the user may intuitively input a command.

Since the operation system 200 may read a touch coordinate system in real time, according to movement of a coordinate value in real time, the operation system 200 determines what a user intended function is and provides different haptic feedback with respect to each function.

In a first mode for providing haptic feedback, the operation system 200 provides haptic feedback of a preset feel with respect to a predefined mode.

In a second mode for providing haptic feedback, the operation system 200 analyzes a form of a touch of the user, determines an operation intent of the user, and provides feel feedback corresponding to a function which matches with the operation intent.

When dragging occurs from the touch operation region to the upper region thereof, or movement occurs between the upper regions due to dragging, the operation system 200 provides haptic feedback on a limitation of a region L, thereby providing a three-dimensional operation feeling like dragging between spaced buttons.

When the number of touch operation regions of the in-vehicle display 100 is changed, the operation system 200 adjusts a haptic discrimination region in the touch operation region.

For example, as shown in an upper part of FIG. 1, when a total of four regions including an HUD region is present, the touch operation region is segmented into four regions so as to provide different feels, and as shown in a lower part of FIG. 1, when a total of six regions including the HUD region is present, the touch operation region is segmented into six regions so as to provide different feels.

When an input of a long key (in which a key input state is maintained for a certain period of time) is made in the touch operation region, the operation system 200 provides different haptic feedback at the same point (for example, by differently controlling a pulse value in a time-series manner), thereby providing feedback with respect to the input of the long key.

FIG. 4 shows an example of a display form according to an embodiment of the present invention, and FIG. 5 shows an operation concept for moving a display according to an embodiment of the present invention.

According to the embodiment of the present invention, an intuitive screen movement operation configuration according to directivity (sequence) of a display is proposed for a movement operation configuration between display regions (screens).

A movement function between display areas is provided through a multi-touch rotation operation in the form of a jog or the like.

In addition, as shown in FIG. 5, a position w of a wrist support is determined as a horizontal form for a left-right movement, a vertical form for a forward-backward movement, or a rotation form, the display region is automatically moved based on a portion which is touched by a wrist, and a touch input is received through the operation system 200.

In addition, with respect to the rotation form, the present invention is not limited to rotation on a two-dimensional plane, and it is possible to provide a movement function between the display regions by gripping and rotating (rolling) the operation system 200 with a hand of a user.

Figure 6:
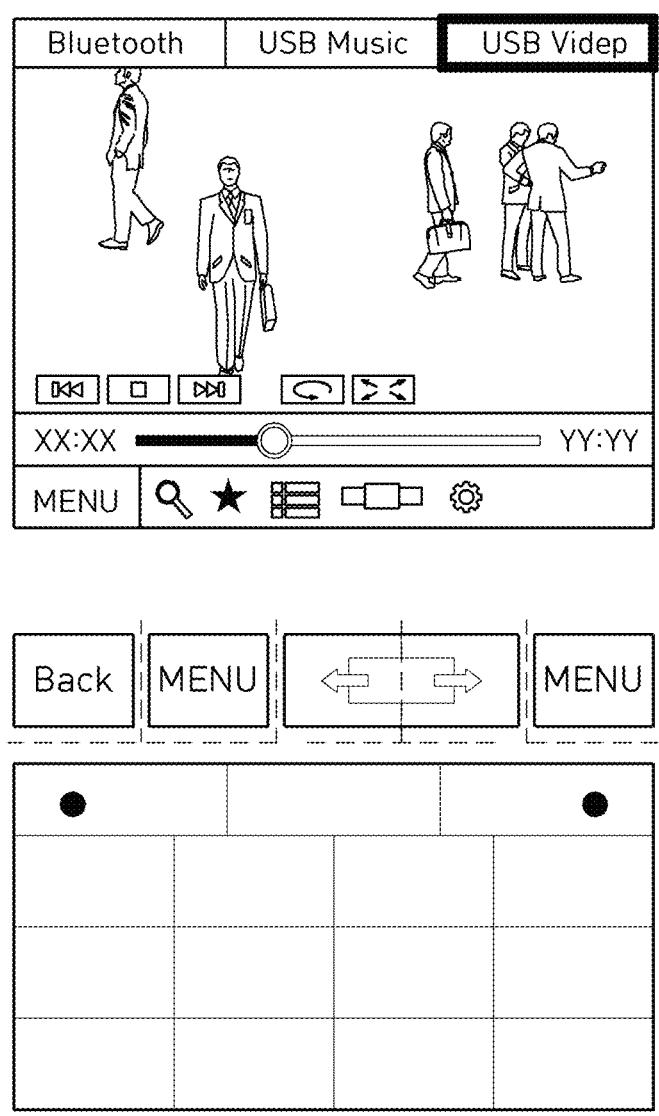
FIG. 6 shows a feel separation area of the operation system according to an embodiment of the present invention.

FIG. 6 shows a feel separation area of the operation system according to an embodiment of the present invention.

An operation system according to an embodiment of the present invention segments a region for providing haptic feedback according to an attribute (group) of an operation region of a system (e.g., an Audio Video Navigation (AVN)).

For example, as shown in FIG. 6, a screen of the AVN includes Bluetooth, universal serial bus (USB) Music, and USB Video which are provided in an upper layer, contents of Back, Stop, Forward, Repeat Playback, and Full Screen, which are provided in an intermediate layer, and Menu, Search, Favorite, List, Setting, and the like which are provided in a lower layer.

A touch operation region of the operation system is segmented according to the attribute (group) of the AVN which is a system currently matched to provide a different feel in each segmented region.

The above description is applied to an example in which a touch operation is performed in an absolute coordinate system but may also be applied to a relative coordinate system.

Figure 7:
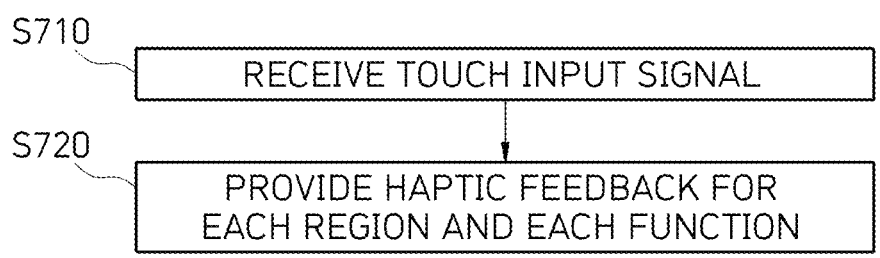
FIG. 7 is a flowchart illustrating a method of controlling a display of a vehicle according to an embodiment of the present invention.

FIG. 7 is a flowchart illustrating a method of controlling a display of a vehicle according to an embodiment of the present invention.

A method of providing haptic feedback to a vehicle display control according to the present invention includes receiving a touch input signal with respect to a touch operation region by a user for vehicle display control (S710)

and, in response to the touch input signal, providing haptic feedback of a different feel for each touch operation region and each function (S720).

In operation S720, a frequency and strength of a vibration are adjusted to provide haptic feedback.

In operation S720, in consideration of a driving situation such as a road surface vibration and the like, a manner of providing the haptic feedback is changed.

In operation S720, when a drag input is received in other regions from the touch operation region, or a drag input is received between other regions, haptic feedback of a three-dimensional operation feeling is provided at a disconnection between the regions.

In operation S720, when a first mode is set, haptic feedback of a preset feel corresponding to a preselected function mode is provided, and, when a second mode is set, haptic feedback with respect to a function, which corresponds to an intent of the user determined according to an analysis result of a touch input form of the user, is provided.

In operation S720, when the number of operation regions of an in-vehicle display is varied according to movement of the in-vehicle display, the number of haptic discrimination regions of the touch operation region is adjusted to correspond to the number of operation regions.

In operation S720, when an input of a long key is performed in the touch operation region, haptic feedback is differently provided at the same position according to the passage of time, thereby providing the haptic feedback with respect to the input of the long key.

Figure 8:
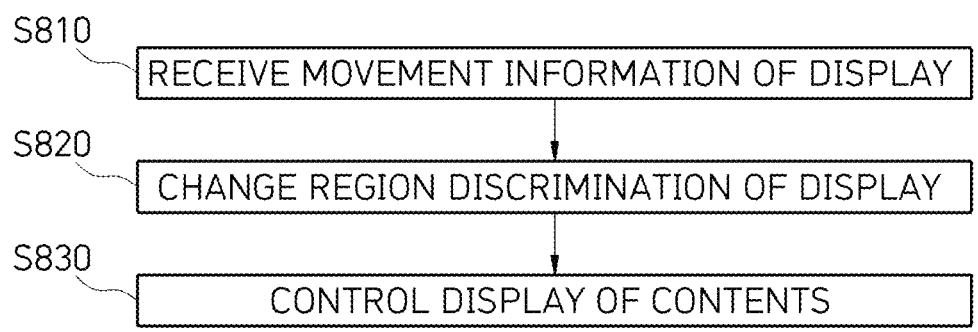
FIG. 8 is a flowchart illustrating a method of controlling a display of a vehicle according to another embodiment of the present invention.

FIG. 8 is a flowchart illustrating a method of controlling a display of a vehicle according to another embodiment of the present invention.

According to another embodiment of the present invention, there is provided a control system and a control method for changing contents and a display region which are displayed on a large-screen display device according to a physical movement of the large-screen display device.

According to another embodiment of the present invention, contents being displayed and a display region thereof are changed according to movement of the large-screen display device between a driver's seat and a passenger seat so that there is an effect that is capable of providing a service of contents (including basic driving information and driving assist information) which meet the needs of a driver and a passenger.

The method of controlling a display of a vehicle according to another embodiment of the present invention includes receiving movement information of an in-vehicle display (S810), changing region discrimination of the in-vehicle display in consideration of the movement information (S820), and controlling a display of contents for each region in consideration of the change of the region discrimination (S830).

In operation S810, information on a movement direction, a distance, and a movement speed of the in-vehicle display is received.

In operation S820, the number of display regions is varied in consideration of the movement direction included in the movement information.

In operation S820, when the in-vehicle display is moved from a driver's seat to a passenger seat, the number of display regions is increased, and, when the in-vehicle display is moved from the passenger seat to the driver's seat, the number of display regions is decreased.

In operation S830, in consideration of the movement of the in-vehicle display, a screen region with respect to a preset function is maintained as the same display region based on a position of a driver.

For example, even when the in-vehicle display is moved, a screen providing a navigation function at which the driver always looks is disposed at the same position based on the driver's seat.

In operation S830, a display of contents is controlled in consideration of the movement information and importance classification of the contents.

For example, when the in-vehicle display is moved from the driver's seat to the passenger seat, an area of a region closest to the driver's seat becomes smaller as the display is relatively moved.

Thus, speedometer information corresponding to some of RPMs, driving information (including a mileage, fuel efficiency, a time), and speedometer information which are previously displayed in the region closest to the driver's seat is displayed in a changed region according to the movement.

In an embodiment, the speedometer information is moved to an HUD region and displayed therein, and the driving information (including the mileage, the fuel efficiency, and the time) is controlled to be displayed in the changed region.

A system for controlling a display of a vehicle according to another embodiment of the present invention includes an input part for receiving movement information of an in-vehicle display, a memory in which a program of controlling a display in consideration of the movement information is stored, and a processor for executing the control program, and the processor changes region discrimination of the display according to the movement information and controls to change contents being displayed according to the change of the region discrimination.

Even in a movement situation of the display, the processor maintains a screen region for a preset function included in the display as the same display region based on a position of a driver.

The processor increases or decreases the number of screen regions of the display according to the movement information and changes the contents according to the change of the number of screen regions.

The processor receives a command input through an operation system and controls movement between the regions of the display and execution of functions within the regions.

The processor controls to change contents displayed on a head-up display by linking with the movement information.

The processor changes the contents according to the movement information in consideration of importance classification of the contents.

Hereinafter, a vehicle display device according to still another embodiment of the present invention will be described.

According to the related art, a technology has been proposed that includes a vehicle display device and provides contents according to a user's selection or a driving situation.

However, the related art merely proposes a form in which the vehicle display device is fixedly disposed in front of a driver's seat and a passenger seat, so there is a limitation in providing a service.

The vehicle display device according to still another embodiment of the present invention has been proposed to solve the above described problem, and an objective of the present invention is to provide the vehicle display device which automatically controls a position of the display according to a gaze of a driver to secure a field of view of the driver.

The vehicle display device according to still another embodiment of the present invention includes front and rear covers for surrounding a display serving as a cluster function, a screen part including a fixing bracket connected behind the rear cover, a state detector configured to monitor a gaze direction of the driver, and a driver disposed between the driver's seat and the passenger seat of a vehicle and configured to move a position of the screen part according to the gaze direction of the driver, which is monitored by the state detector.

A drive bracket is engaged between the screen part and the driver.

A front surface of the drive bracket is connected to a fixing bracket of the screen part, and a rear surface thereof is connected to the driver.

The screen part and the drive bracket are slidably moved by the driver between the driver's seat and the passenger seat of the vehicle.

The drive bracket is snap-fitted with the fixing bracket.

The driver receives a data value of the gaze direction of the driver from the state detector, compares the data value with a preset information value and calculates a comparison result, and moves the screen part to a preset position according to a result value of the calculation.

The driver adjusts the position of the screen part between the driver's seat and the passenger seat of the vehicle in an upward, downward, left, or right direction.

The driver may control to tilt the position of the screen part to allow a display of the screen part to correspond to the gaze direction of the driver.

The fixing bracket of the screen part includes a base plate connected to a rear side of the rear cover, and a cover plate connected to the base plate.

The base plate includes a guide holder for surrounding an electric cable of the display, and the cover plate is disposed to be spaced apart from the guide holder and includes a wiring holder for surrounding the electric cable passing through the guide holder.

The guide holder is formed to extend from a lower end of the base plate and has a perforated structure in a front-rear direction. The guide holder has one open side so as to allow the electric cable of the display to be inserted into and seated on the guide holder.

The wiring holder is formed to extend from a lower end of the cover plate and has a perforated structure in a front-rear direction. The wiring holder has one open side so as to allow the electric cable of the display to be inserted into and seated on the wiring holder.

A vehicle display device according to yet another embodiment of the present invention includes a placing part disposed in a dashboard of a vehicle, a screen part disposed to be movable in position in front of the placing part and configured to display various pieces of information related to an operation of a vehicle and a status thereof, a state detector for monitoring a gaze direction of a driver, a driver connected to the placing part and configured to move a position of the screen part according to the gaze direction of the driver which is monitored from the state detector, and a connector including a drive bracket connected to the driver and a screen bracket connected to the drive bracket.

The driver includes rails disposed in a state of being spaced apart from each other in an upper portion and a lower portion of a front side of the placing part; a plurality of sliders slidably moved on the rails and engaged with the drive bracket; a drive piece connected on the placing part, disposed on both ends of each of the rails, and configured to move the sliders; and a controller for receiving a data value of the gaze direction of the driver from the state detector, comparing the data value with a preset information value, and controlling driving of the drive piece according to a result value of the comparison.

The drive piece is disposed behind the placing part and includes a drive motor having a rotating shaft which is connected to pass through a front side of the placing part; a first pulley disposed in front of the placing part and rotated by the rotating shaft; a second pulley rotatably connected to a front side of the placing part and disposed to be spaced apart from the first pulley in a horizontal direction; a belt configured to surround circumferential surfaces of the first pulley and the second pulley to mutually interlock the first pulley and the second pulley; and a belt bracket moving in conjunction with the belt and engaged with the drive bracket in a state of being disposed between the sliders.

The first pulley and the second pulley are surrounded and fixed by a "⊏"-shaped pulley bracket which is engaged with the front side of the placing part. The pulley bracket has a rotating shaft connected to the first pulley, and a bearing for a rotatable connection of an end portion of a shaft connected to the second pulley.

The second pulley has a structure capable of rotating about the shaft, and one end of the shaft is connected to the bearing of the pulley bracket, and the other end of the shaft is connected to a bearing of an engagement bracket fixed on the rear side of the placing part.

Position sensors for detecting a position of the drive bracket according to whether the drive bracket is in contact with the position sensors are disposed at both ends of the front side of the placing part.

The controller is electrically connected to the position sensors and performs driving stop control on the drive piece when the drive bracket is detected by the position sensors.

Position sensors for transmitting a position data value of the drive bracket to the controller are disposed at the both ends of the front side of the placing part when the drive bracket approaches a predetermined position.

When the position data value received from the position sensors falls within a preset information value range, the controller performs the driving stop control on the drive piece.

The belt bracket is slidably moved on the rails.

A vehicle display device according to yet another embodiment of the present invention includes a screen part disposed around a dashboard of a vehicle; a state detector for monitoring whether the screen part interferes with a steering wheel in consideration of a field of front view of a driver; and a driver for moving a position of the screen part according to whether the screen part interferes with the steering wheel, which is monitored by the state detector.

The driver receives an interference data value between the screen part and the steering wheel based on a gaze position of a driver from the state detector, compares the interference data value with a preset information value and calculates a comparison result, and moves the screen part to a preset position according to a result value of the calculation.

When the vehicle is in an autonomous driving mode, the driver moves the position of the screen part to the driver's seat collinearly regardless of whether the screen part interferes with the steering wheel.

The vehicle display device according to yet another embodiment of the present invention automatically controls a position of a display according to a gaze of the driver so that there is an effect of allowing the driver to easily secure a field of view to stably drive.

Figure 9A:
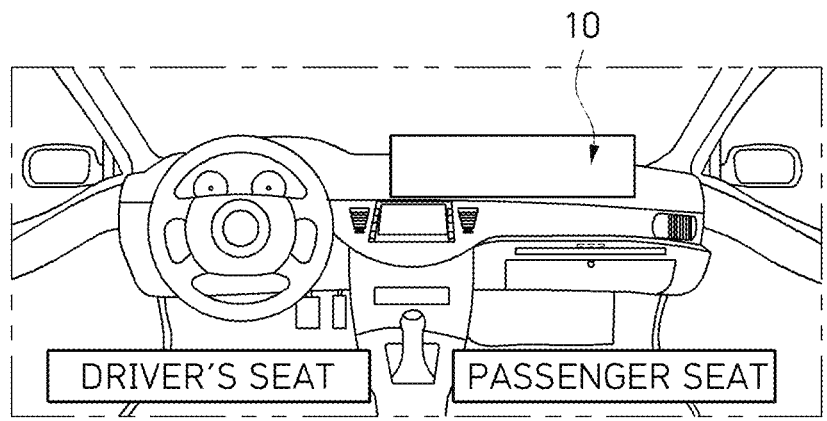
FIG. 9A and FIG. 9B are exemplary diagrams illustrating installation of a vehicle display device according to still another embodiment of the present invention.
Figure 9B:
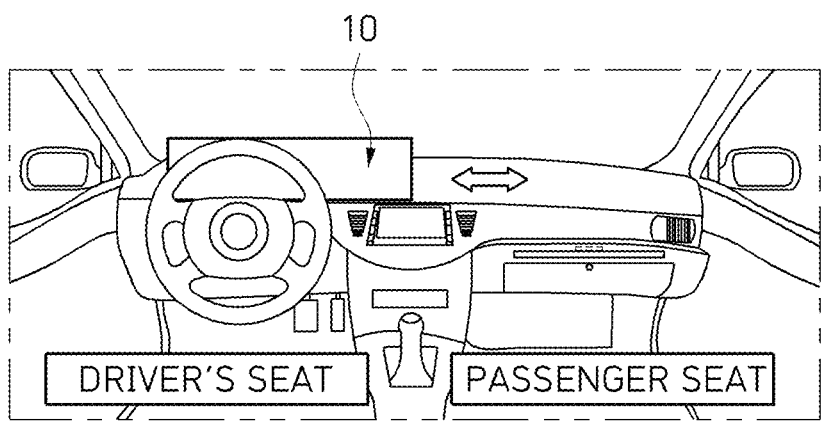

FIG. 9A and FIG. 9B are exemplary diagrams illustrating installation of a vehicle display device according to one embodiment of the present invention.

Referring to FIG. 9A and FIG. 9B, a vehicle display device 10 is disposed between the driver's seat and the passenger seat and is movably installed on a dashboard.

For safe driving of the driver, the vehicle display device 10 basically moves the display according to the gaze of the driver and allows a setting to turn power on or off according to whether the driver looks ahead.

In particular, as shown in FIG. 9B, when the vehicle is in the autonomous driving mode, the vehicle display device 10 is moved to a position of a cluster of the steering wheel so that the driver may look at a screen well.

The vehicle display device 10 may automatically adjust a position of a display according to an occlusion region of the steering wheel. In particular, a movement distance of the display may be automatically adjusted according to recognition of the gaze of the driver.

Meanwhile, in the vehicle display device 10, a function of a steering wheel operation system may be changed according to the position of the display.

That is, when the vehicle display device 10 is located corresponding to the driver's seat, a function of operating a cluster may be performed, and, when the vehicle display device 10 is located corresponding to the passenger seat, a function of operating a HUD may be performed.

When the vehicle is in the autonomous driving mode, it is possible to perform a change such as a position movement or popping-up of the steering wheel. This expands a space in front of the driver's seat and increases the freedom of use of the driver so that the present invention provides an environment in which the display may be used in front of the driver's seat.

Figure 10:
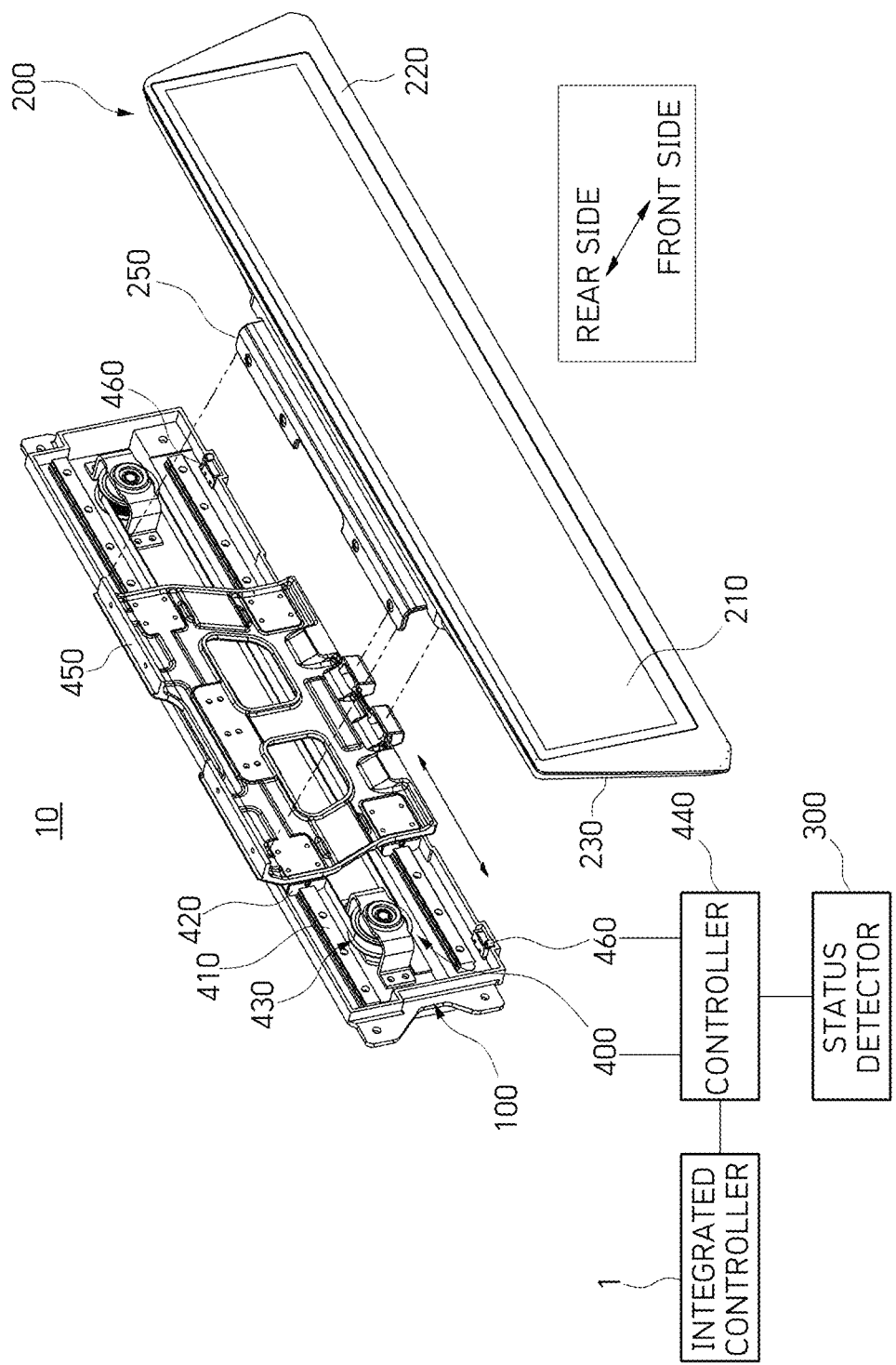
FIG. 10 is a schematic diagram illustrating a vehicle display device according to yet another embodiment of the present invention.
Figure 11:
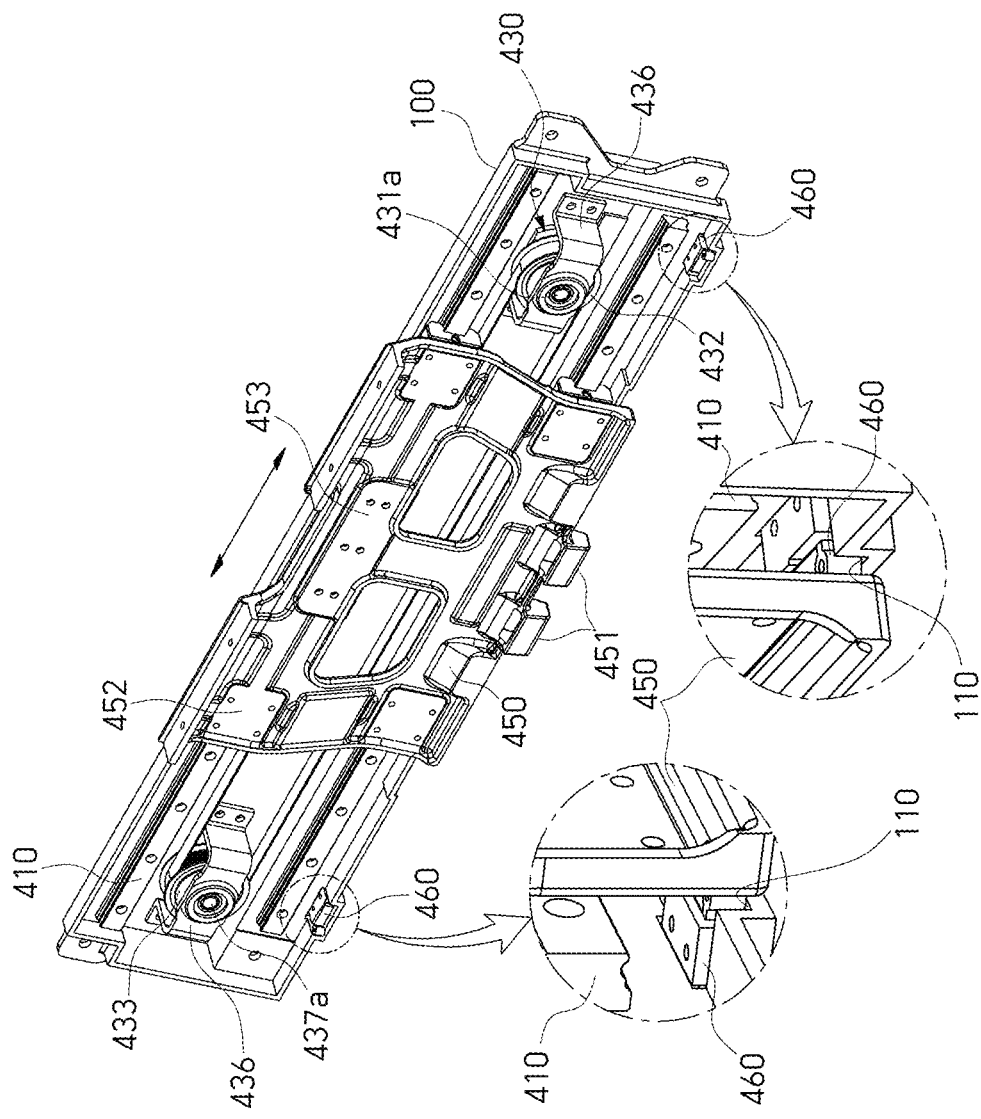
FIG. 11 is a schematic diagram illustrating a driver and a drive bracket connected to a placing part in the vehicle display device according to yet another embodiment of the present invention.
Figure 12:
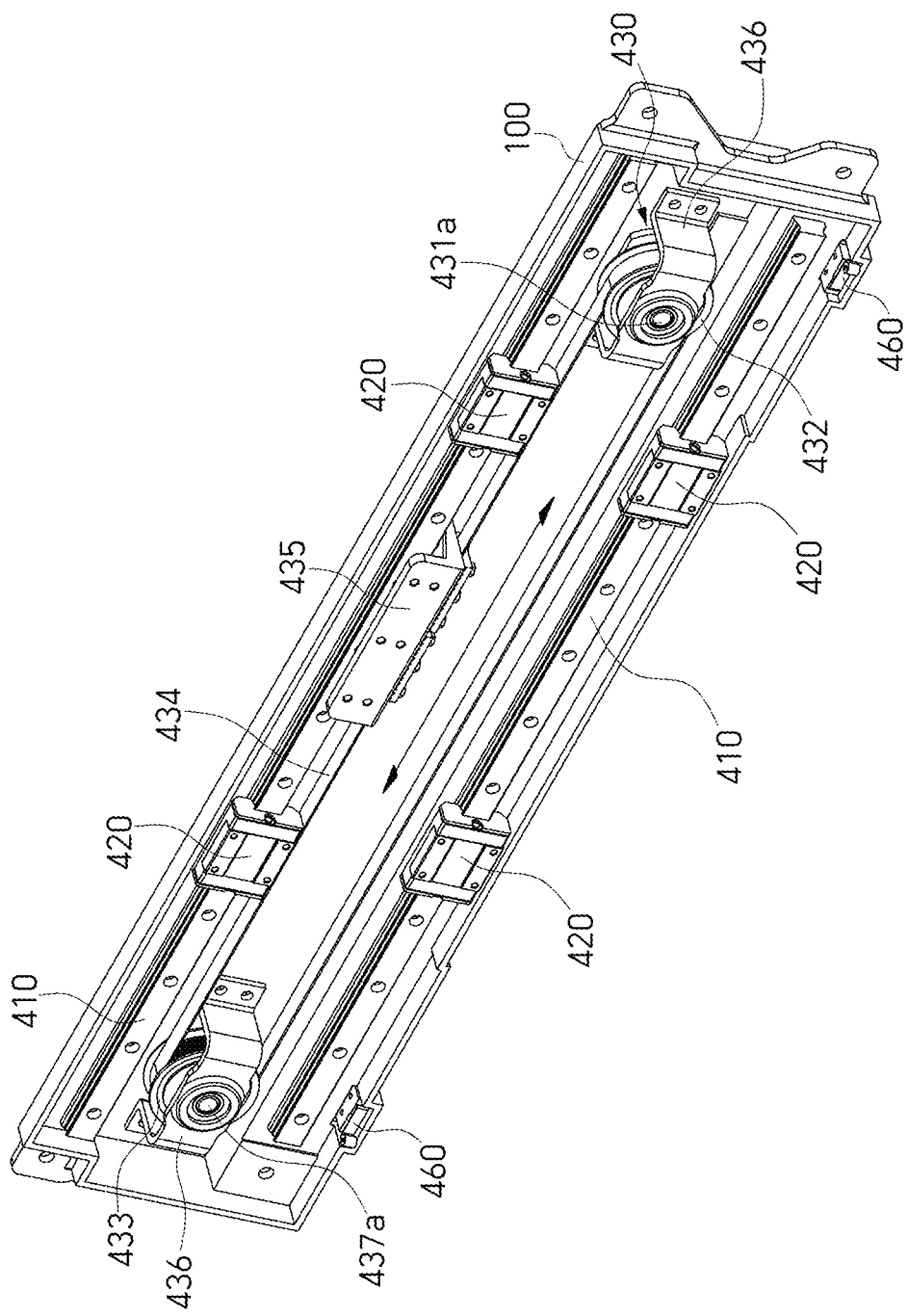
FIG. 12 is a schematic diagram illustrating front sides of the placing part and the driver in the vehicle display device according to yet another embodiment of the present invention.
Figure 13:
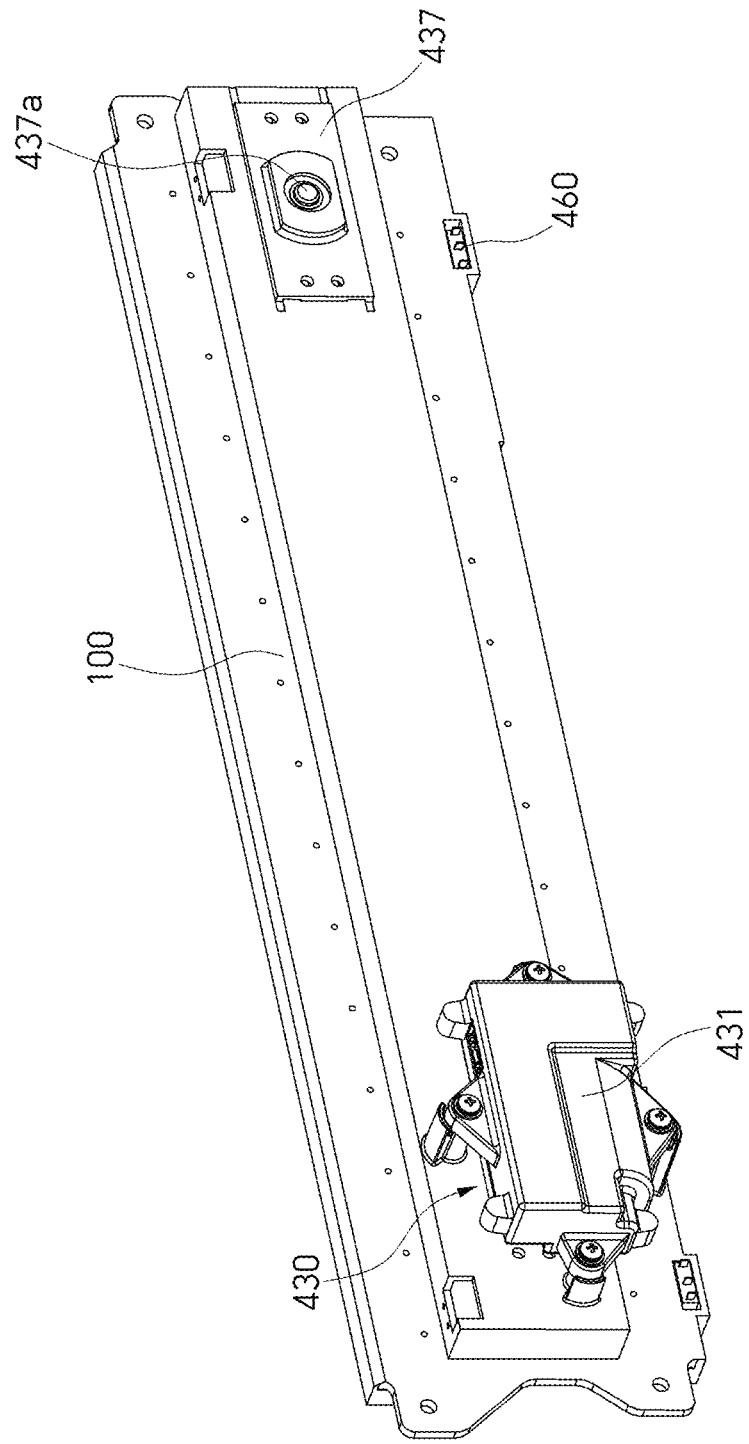
FIG. 13 is a schematic diagram illustrating rear sides of the placing part and the driver in the vehicle display device according to yet another embodiment of the present invention.

FIG. 10 is a schematic diagram illustrating the vehicle display device according to one embodiment of the present invention, FIG. 11 is a schematic diagram illustrating a driver and a drive bracket which are connected to a placing part, and FIGS. 12 and 13 are schematic diagrams illustrating front sides and rear sides of the placing part and the driver.

Referring to FIGS. 10 to 13, the vehicle display device 10 includes a placing part 100, a screen part 200, a state detector 300, a driver 400, and a connector.

Prior to describing these components, directions will be briefly described.

Basically, headlights are provided at a front side of a vehicle and rear combination lamps are provided at a rear side of the vehicle. In this disclosure, a front side (and a front surface) refers to a side toward the rear combination lamps of the vehicle based on a dashboard of the vehicle instead of the front side of the vehicle.

In this disclosure, a rear side (and a rear surface) refers to a side toward the headlights of the vehicle based on the dashboard of the vehicle instead of the rear side of the vehicle.

Next, a configuration of the vehicle display device 10 will be described.

The placing part 100 is disposed in the dashboard of the vehicle. The placing part 100 has an accommodation space therein and an open front surface.

The screen part 200 is disposed to be movable in position at a front side of the placing part 100.

The screen part 200 includes a display 210, a front cover 220, a rear cover 230, a wiring 240, and a fixing bracket 250.

The display 210 displays various pieces of information related to an operation and a status of the vehicle.

The front cover 220 covers and protects a rim of a front surface of the display 210, and the rear cover 230 covers and protects a rim of a rear surface of the display 210. In this case, the front cover 220 and the rear cover 230 are coupled to be detachable from each other.

The wiring 240 is a component for transmitting power to the display 210 and means an electric cable to be connected to internal components of the display 210 to form a circuit, a manner, and a line.

The fixing bracket 250 is a component connected to a rear side of the rear cover 230 and includes a base plate 251 and a cover plate 252.

The base plate 251 is directly connected to the rear side of the rear cover 230. The base plate 251 is formed in a "⊏" shape having one open side so as to cover and protect the wiring 240 of the display 210.

In particular, in order to effectively protect the wiring 240, a guide holder 251a is formed to extend from a lower end of the base plate 251.

The cover plate 252 is indirectly connected to the rear side of the rear cover 230 by interposing the base plate 251 therebetween. That is, the cover plate 252 is connected to a rear side of the base plate 251.

The cover plate 252 is formed in a "⊐" shape which is open in a direction opposite to the base plate 251 in a state of being in contact with the base plate 251.

A wiring holder 252a is formed to extend from a lower end of the cover plate 252. The wiring holder 252a is disposed to be spaced apart from the guide holder 251a and surrounds and protects the wiring 240 of the display 210.

The state detector 300 monitors a gaze direction of the driver (a driver status monitoring (DSM)). The state detector 300 serves to perform a function of assisting safe driving by observing a gaze of the driver.

In conjunction with the driver 400, the state detector 300 determines a gaze direction of the driver and whether eyes of the driver are closed through a face image frame of the driver and a DSM algorithm to determine whether the driver keeps his or her eyes forward.

The driver 400 moves a position of the screen part 200 according to the gaze direction of the driver, which is monitored by the state detector 300.

The driver 400 is connected to the placing part 100. In this case, the driver 400 includes rails 410, a slider 420, a drive piece 430, and a controller 440.

The rails 410 are disposed at the front side of the placing part 100. The rails 410 are disposed in parallel in a state of being spaced apart from each other in an upper portion and a lower portion of the front side of the placing part 100.

The slider 420 may be slidably moved on the rail 410 in a left-right direction. In this case, a plurality of sliders 420 are engaged with the rail 410. The slider 420 is engaged with a mount portion of the drive bracket 450.

The drive piece 430 is connected to the placing part 100 and disposed around both ends of the rail 410. The drive piece 430 provides a driving force to the slider 420 to allow the slider 420 to be moved on the rail 410.

The drive piece 430 includes a drive motor 431, a first pulley 432, a second pulley 433, a belt 434, a belt bracket 435, a pulley bracket 436, and an engagement bracket 437.

The drive motor 431 is disposed at the rear side of the placing part 100 and has a rotating shaft 431a connected to pass through the front side of the placing part 100.

The first pulley 432 is disposed at the front side of the placing part 100 and rotated by the rotating shaft 431a.

The second pulley 433 is rotatably connected to the front side of the placing part 100. In addition, the second pulley 433 is horizontally disposed to be spaced apart from the first pulley 432.

The belt 434 surrounds circumferential surfaces of the first pulley 432 and the second pulley 433 to mutually interlock the first pulley 432 with the second pulley 433.

The belt bracket 435 is moved by interlocking with the belt 434. The belt bracket 435 is engaged with the drive bracket 450 in a state of being disposed between the plurality of sliders 420.

The belt brackets 435 may be engaged with the rail 410 to be slidably moved on the rail 410.

The pulley bracket 436 is engaged with the front side of the placing part 100. The pulley bracket 436 is formed in a "⊏" shape to surround and fix the first and second pulleys 432 and 433.

In this case, the pulley bracket 436 has a bearing for rotatably connecting the rotating shaft 431a connected to the first pulley 432 to an end portion of the shaft 437a connected to the second pulley 433.

Here, the second pulley 433 has a structure capable of being rotated around the shaft 437a. One end of the shaft 437a is connected to the bearing of the pulley bracket 436, and the other end thereof is connected to a bearing of the engagement bracket 437 fixed to the rear side of the placing part 100.

The controller 440 receives a data value of the gaze direction of the driver from the state detector 300. Thereafter, the controller 440 compares the data value of the gaze direction of the driver with a preset information value, calculates the comparison result, and controls driving of the drive piece 430 according to a result value of the comparison.

Here, the data value of the gaze direction of the driver means a value which is numerically obtained by extracting three-dimensional coordinates of a face of the driver through a device (such as an imaging device or the like) for recognizing the face of the driver based on a front face thereof.

The preset information value means a value which is numerically obtained by matching the image frame recognizing the front face of the driver to a front surface of the display 210.

Thus, the controller 440 compares the data value of the gaze direction of the user with the preset information value through the DSM algorithm to calculate the comparison result.

In addition, the controller 440 controls the driving of the drive piece 430 to allow the front surface of the display 210 to correspond to the gaze direction of the user.

The controller 440 may be operated by being electrically connected to an integrated controller 1 capable of entirely controlling the vehicle.

Meanwhile, the connector may be formed in a shape including the drive bracket 450 engaged with the driver 400, and the fixing bracket 250 fixed to the screen part 200 and connected to the drive bracket 450.

A front surface of the drive bracket 450 is connected to the fixing bracket 250, and a rear surface thereof is connected to the driver 400. Here, the drive bracket 450 is formed in a snap-fit engagement structure which is detachable from the fixing bracket 250.

In this case, the drive bracket 450 is slide-moved together with the screen part 200 by the driver 400 between the driver's seat and the passenger seat of the vehicle.

To this end, the drive bracket 450 includes a slider mount 452 connected to the slider 420 and a belt bracket mount 452 connected to the belt bracket 435.

Engagement holes 451, which are detachable from hooks 252a formed at a lower end of the cover plate 252, are formed in a lower end of the drive bracket 450 at predetermined intervals.

Position sensors 460, which detect a position of the drive bracket 450 according to whether the position sensors 460 are in contact with the drive bracket 450, are disposed in seating grooves 110 formed in two ends of the front side of the placing part 100. Here, each of the seating grooves 110 is formed in a stepped shape at a lower end of the placing part 100.

The controller 440 is electrically connected to the position sensors 460. Here, each of the position sensors 460 may be formed as a contact or non-contact type sensor.

When the position sensor 460 is a contact type sensor and the drive bracket 450 is in contact with the position sensor 460, the controller 440 performs driving stop control on the drive piece 430.

Meanwhile, when the position sensor 460 is a non-contact type sensor and the drive bracket 450 approaches within a predetermined position around the position sensor 460, the position sensor 460 transmits a position data value to the controller 440.

In this case, when the position data value received from the position sensor 460 falls within a preset information value range, the controller 440 performs the driving stop control on the drive piece 430.

The controller 440 is electrically connected to the position sensors 460. When a position of the drive bracket 450 is detected by the position sensor 460 in a contact manner, the controller 440 performs the driving stop control on the drive piece 430.

The position sensor 460 has a function of recognizing that the drive bracket 450 reaches a position of the driver's seat or the passenger seat and transmitting a stop signal to the controller 440.

Figure 14:
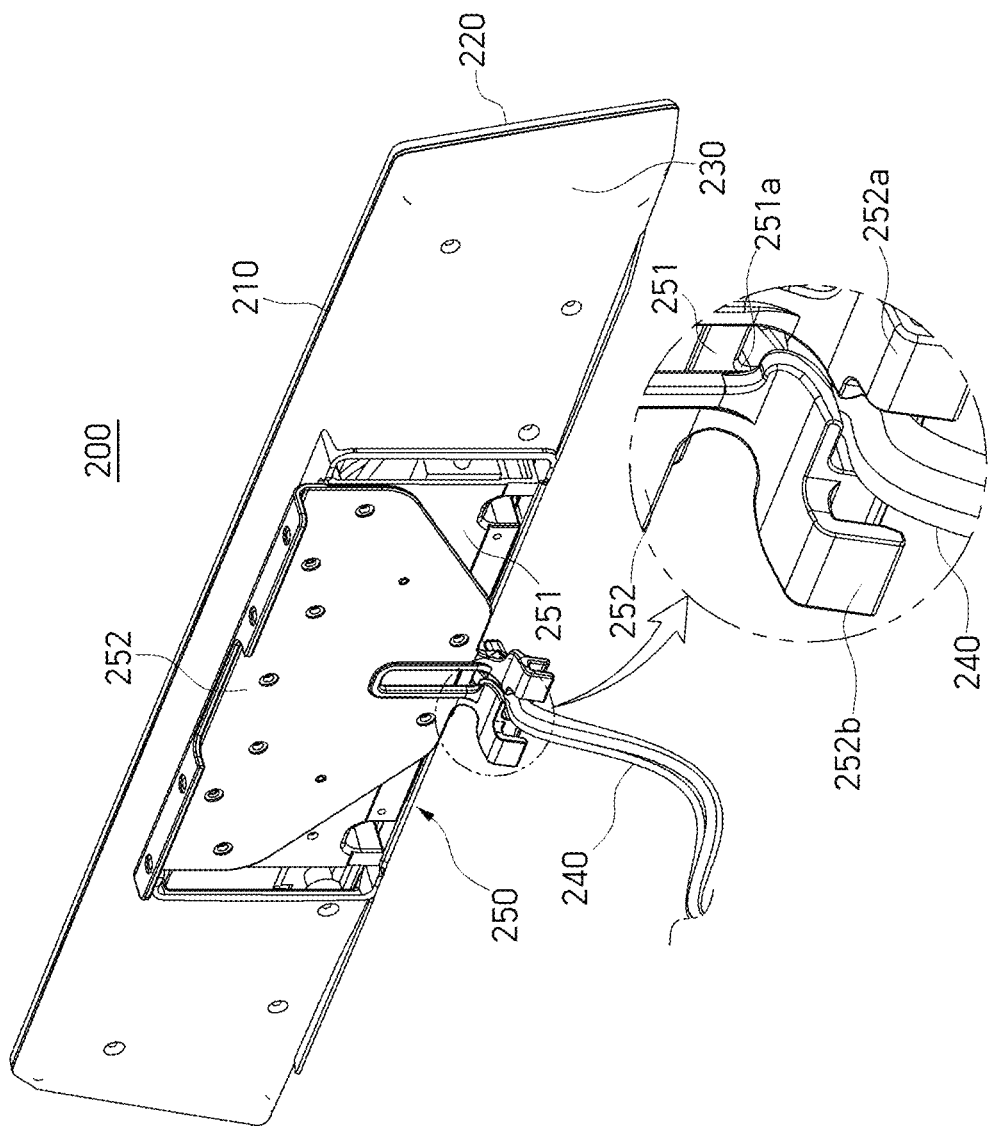
FIG. 14 is a schematic diagram illustrating a rear side of a screen part in the vehicle display device according to yet another embodiment of the present invention.
Figure 15:
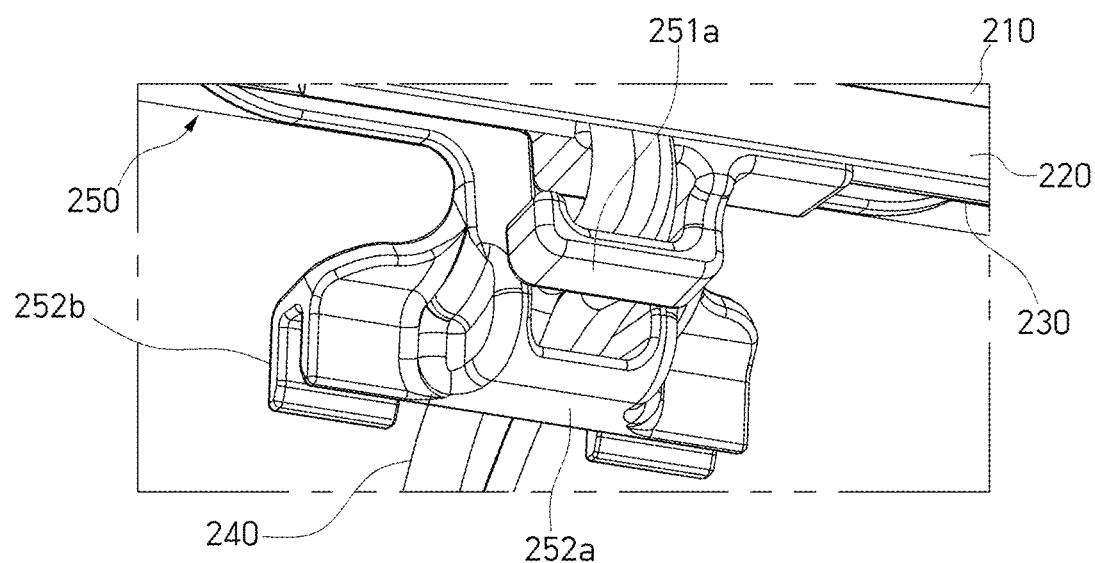
FIG. 15 is a schematic diagram illustrating some components in the vehicle display device according to yet another embodiment of the present invention.

FIG. 14 is a schematic diagram illustrating a rear side of the screen part in the vehicle display device according to one embodiment of the present invention, and FIG. 15 is a diagram illustrating a partial configuration of the screen part.

Referring to FIGS. 14 and 15, the display 210 of the screen part 200 is disposed between the front cover 220 and the rear cover 230 to be protected.

In this case, the fixing bracket 250 engaged with the rear side of the rear cover 230 includes the base plate 251 and the cover plate 252 which prevent damage to the rear side of the display 210 and the wiring 240.

Here, the guide holder 251a is formed to extend from the lower end of the base plate 251, and the wiring holder 252a is formed to extend from the lower end of the cover plate 252.

The guide holder 251a has a structure which is perforated in a front-rear direction. The guide holder 251a has one open side so as to allow the wiring 240 of the display 210 to be inserted into and seated in the one open side.

The wiring holder 252a has a structure which is perforated in a front-rear direction. The wiring holder 252a has one open side so as to allow the wiring 240 of the display 210 to be inserted into and seated in the one open side.

Figure 16:
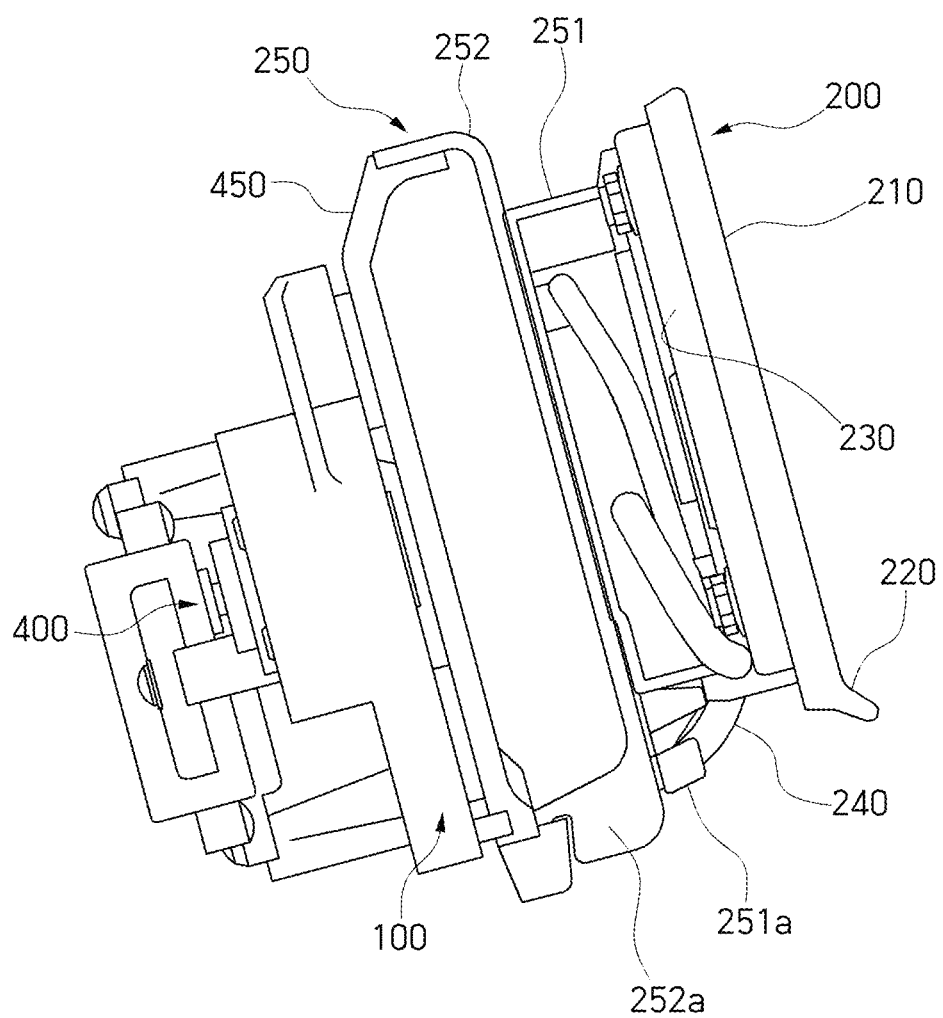
FIG. 16 is a schematic diagram illustrating a lateral surface of the vehicle display device according to yet another embodiment of the present invention.

FIG. 16 is a schematic diagram illustrating a lateral surface of the vehicle display device according to one embodiment of the present invention.

Referring to FIG. 16, the driver 400 is a modified example and may adjust the position of the screen part 200 between the driver's seat and the passenger seat of the vehicle in upward, downward, left, or right direction or may adjust a tilting of the position of the screen part 200.

That is, the driver 400 is formed to have a separate link structure with the placing part 100 and may adjust the position of the placing part 100 in the upward, downward, left, or right direction.

Simultaneously, the driver 400 adjusts a sliding of the screen part 200 on the placing part 100 in the left-right direction and adjusts a tilting of the screen part 200, thereby controlling the display 210 of the screen part 200 to be changed at an omnidirectional angle.

To this end, a spherical-shaped joint (not shown) may be connected between the screen part 200 and the placing part 100.

As described above, the driver 400 automatically adjusts the position of the display 210 of the screen part 200 according to the gaze of the driver, thereby providing an effect of allowing the driver to safely drive while looking at the display 210.

For example, in order to prevent light reflection from the display 210 according to a direction of external light or prevent a reflection of the face of the driver due to night lighting from the display 210, the driver 400 automatically adjusts the position of the display 210.

In particular, when a vehicle equipped with the present invention crashes or a vehicle accident occurs, in order to minimize injury to an occupant, the driver 400 may move the display 210 toward an engine room of the vehicle.

In this case, the display 210 may provide information on a position movement to the driver through a built-in speaker (not shown) or a speaker (not shown) which is an external component.

That is, the speaker connected to the display 210 may provide different kinds of sound for each section according to the position movement of the display 210. For example, examples of the different kinds of sound include music such as a bell sound, songs, voice notifications, and the like.

Whenever the position of the display 210 is moved by the driver 400, colors, shapes, and images displayed on the screen may be changed by being linked with the position movement of the display 210.

The integrated controller 1 in FIG. 2 may control a turning on/off of the display 210 according to the gaze position of the driver. For example, when the driver does not keep his or her eyes forward and a HUD or the display 210 is turned off, a probability that the driver keeps his or her eyes forward is increased.

This becomes the cornerstone of safe driving, and the driver may drive more carefully to prevent accidents caused by negligence.

When the vehicle is in the autonomous driving mode, since it is not essential for the driver to keep his or her eyes forward, information of the HUD may be displayed on the display 210. Such a manner may provide some necessary information to an infotainment display 210 with respect to driving information.

Meanwhile, a vehicle display device 10 according to another embodiment of the present invention may include a screen part 200, a state detector 300, and a driver 400.

The screen part 200 is disposed around the dashboard of the vehicle.

The state detector 300 monitors whether the screen part 200 interferes with a steering wheel (not shown) in consideration of the field of view of the driver.

The driver 400 moves a position of the screen part 200 according to whether the screen part 200 interferes with a steering wheel, which is monitored by the state detector 300.

The driver 400 receives an interference data value between the screen part 200 and the steering wheel from the state detector 300 based on the gaze position of the driver.

The driver 400 may compare the interference data value between the screen part 200 and the steering wheel with a preset information value, calculate the comparison result, and move the screen part 200 to a preset position according to a result value of the calculation.

When the vehicle is in the autonomous driving mode, the display 210 may be moved to a region of the steering wheel. In this case, the driver 400 moves the position of the screen part 200 to the driver's seat collinearly regardless of whether the screen part 200 interferes with the steering wheel.

Figure 17:
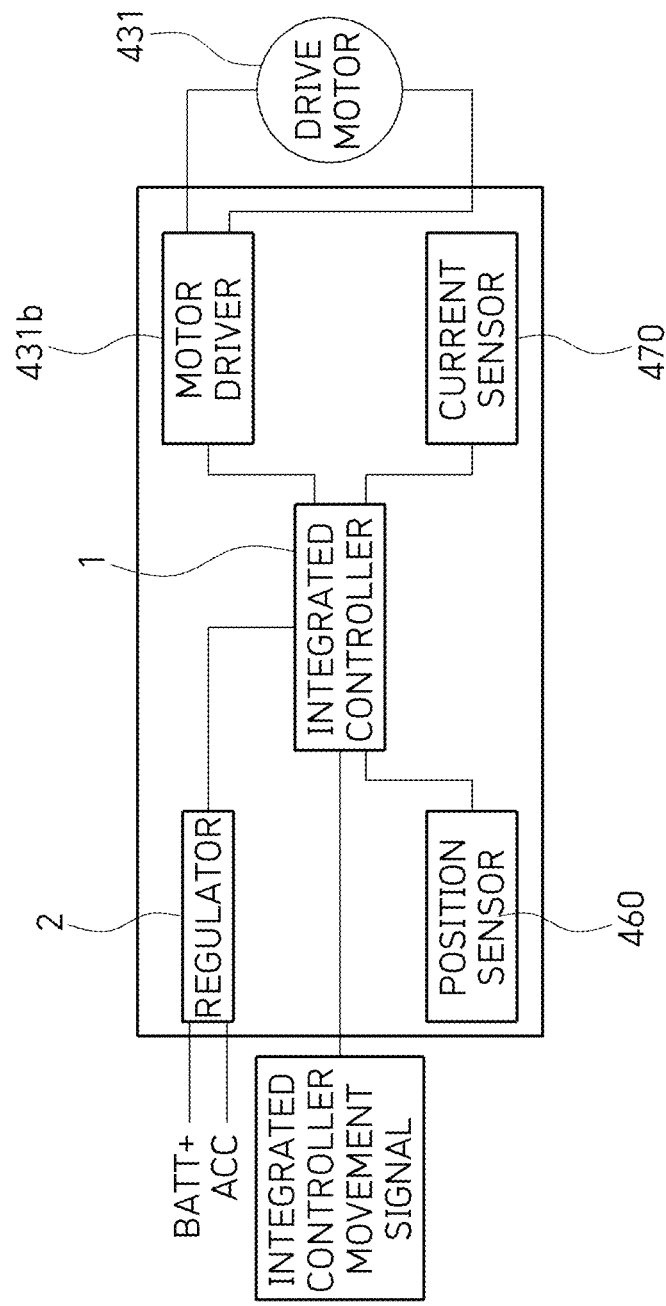
FIG. 17 is a schematic diagram illustrating an operation circuit of the vehicle display device according to yet another embodiment of the present invention.

FIG. 17 is a schematic diagram illustrating an operation circuit of the vehicle display device according to one embodiment of the present invention.

Referring to FIG. 17, the present invention is implemented to have a structure in which a regulator 2, a position sensor 460, a current sensor 470, a drive motor 431, and a motor driver 431*b* are electrically connected to the integrated controller 1 and operated.

The display of the present invention is disposed between the driver's seat and the passenger seat, and an initial position of the display is located at the passenger's seat.

When a normal state of each component is continuously detected after an ACC mode of the vehicle is turned on, the system operates normally.

In this case, when a display which operates normally is moved according to the gaze of the driver and then reaches a target position, the driver stops driving of the display.

A status value for a position of the display is transmitted to the integrated controller 1.

When the ACC mode is turned off, the display is moved to its initial position (the passenger seat) by the drive motor 431 and then remains in stop mode.

Meanwhile, an abnormal operation mode of the display will be described.

When a stall of the drive motor 431 is detected, the display returns to its initial position and then remains in a return state.

When the display is located in a direction of the driver's seat or passenger seat or is in a state of being moved and a battery is turned off, the display returns to its initial position when normal power is input to the battery.

In this case, when an overcurrent is detected through the current sensor 470, the detection result is transmitted to the integrated controller 1, and the integrated controller 1 returns the display to a previous position.

When the overcurrent occurs during returning of the display in an opposite direction, the display is stopped immediately. According to a separate signal input after the display is stopped, the operation of the display may be resumed.

When a movement signal of the display is received during a stall operation state, the display operates according to a signal received after a stall operation is completed.

When the overcurrent is primarily detected by the current sensor 470 and then the stall is detected while the display is returned in the opposite direction, the movement of the display is stopped immediately.

In connection with a state related to the stall, the movement of the display may be resumed after the status value is transmitted to the integrated controller 1.

Figure 18:
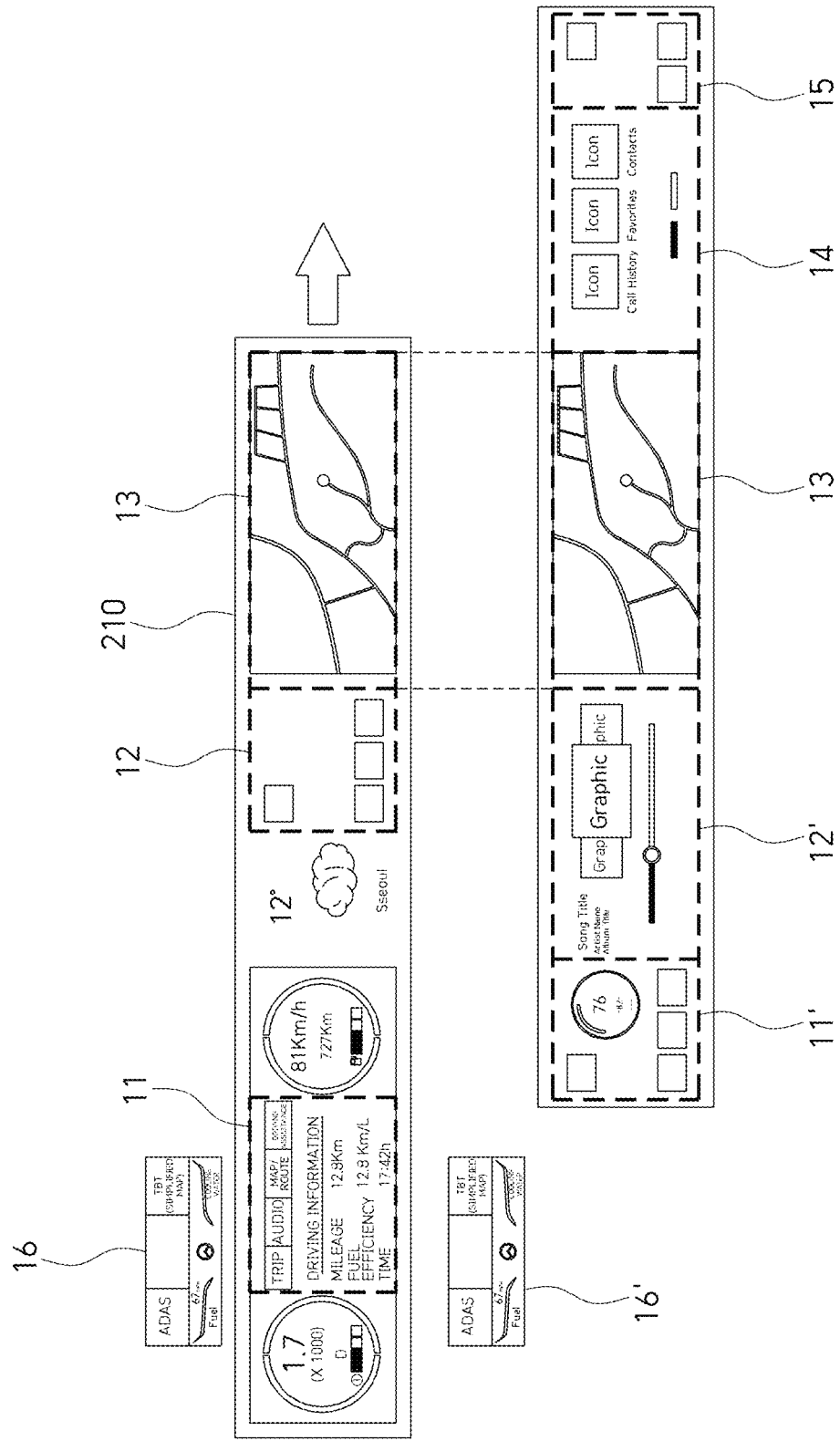
FIG. 18 is a diagram illustrating a screen change structure in the vehicle display device according to yet another embodiment of the present invention.

FIG. 18 is a diagram illustrating a screen change structure in the vehicle display device according to one embodiment of the present invention.

Referring to FIG. 18, the in-vehicle display (large-screen display) 210 is moved in a direction from the driver's seat to the passenger seat.

Prior to the movement, a region of the display 210 is in a state of being segmented into four regions 11, 12, 13, and 16 including a HUD.

After the movement, the region of the display 210 toward the passenger seat is in a state of being segmented into six regions 11', 12', 13, 14, 15, and 16' including the HUD.

Prior to the movement, the display 210 is movable between the regions 11 to 16 by an operation system (not shown). When a command for movement from a current focus region 13 to a right side or a movement from a current focus region 11 to a left side is received through the operation system, the display 210 provides a focus and activation function with respect to a HUD region 16.

In addition, the display 210 is movable in the regions 11' to 16' by the operation system. When a command for movement from a current focus region 15 to the right side or movement from a current focus region 11' to the left side is received through the operation system, the display 210 provides a focus and activation function with respect to a HUD region 16'.

As the display 210 is moved from the driver's seat to the passenger seat, the number of display regions of the display 210 is increased and contents displayed in each region are changed.

For example, RPM, driving information (mileage, fuel efficiency, and a time), and speedometer information are displayed in the region 11, and in response to the movement of the display 210, the region 11' displays driving-related information (speedometer information) in the form of a relatively simplified icon.

The region 13 is a region in which navigation information is displayed. In spite of the movement of the display 210, a screen region with respect to a preset navigation function is maintained as the same display region based on a position of the driver.

It is preferable that some screens are maintained at mechanical positions, and a background image (video) and the display 210 are moved according to a movement speed of the display 210.

According to the present invention, the driving information (a driving speed and the like) displayed in a cluster may be moved to the HUD region 16 and then displayed in the HUD region 106 according to the movement of the display 210.

This is because, as the in-vehicle display 210 is moved, since an area of the region 11 corresponding to the cluster area is decreased to the region 11', and the number of displayable icons or an amount of information provision is decreased, the driving information is moved to the HUD region 16 and then displayed in the HUD region 106.

Figure 19:
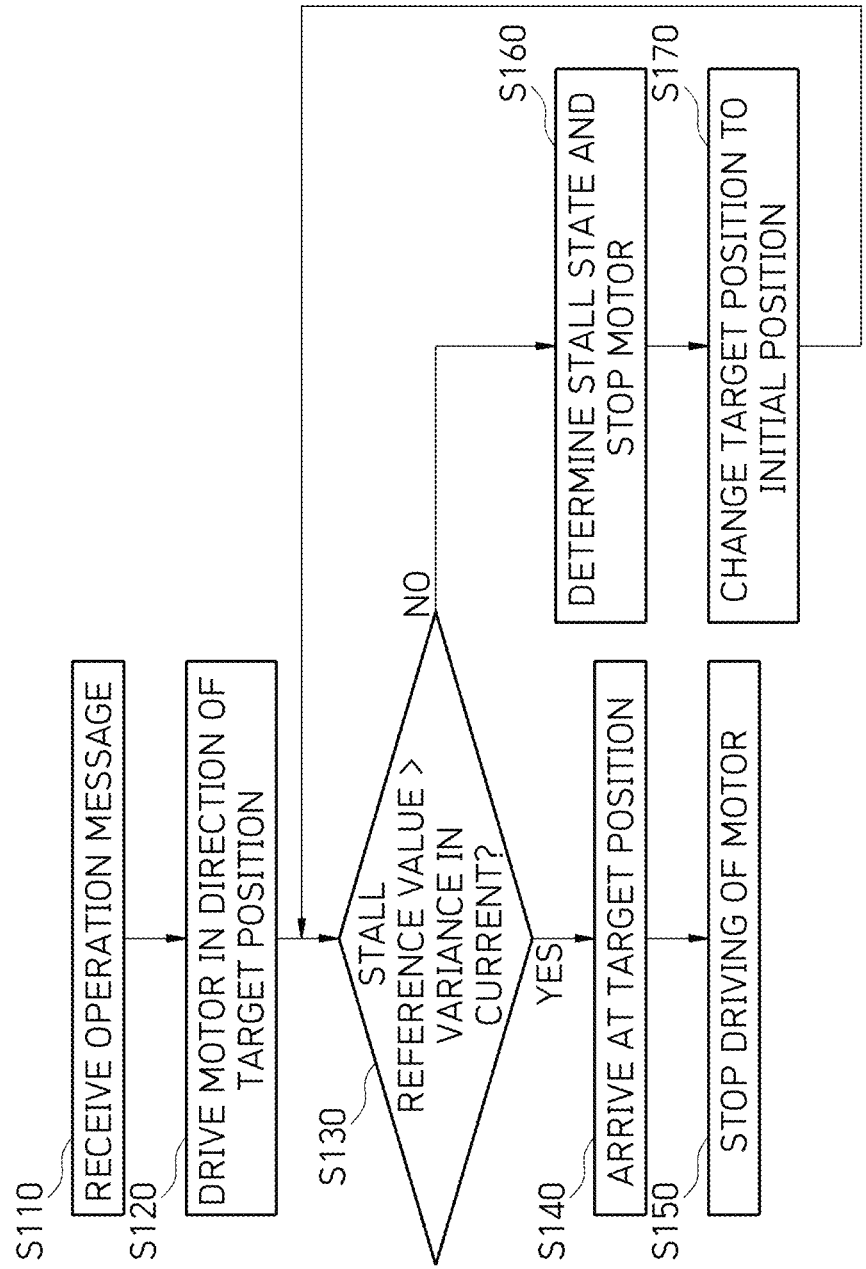
FIG. 19 is a flowchart illustrating an operation sequence of the vehicle display device according to yet another embodiment of the present invention.

FIG. 19 is a flowchart illustrating an operation sequence of the vehicle display device according to one embodiment of the present invention.

Referring to FIG. 19, a method for controlling a vehicle display device includes returning a display to an initial position and transmitting a signal when stalling of a motor is detected.

In this case, the method for controlling a vehicle display device includes receiving an operation message (S110), driving the motor in a direction of a target position (S120), checking a variance in current (S130), directing a vehicle display device to arrive at the target position (S140), stopping driving of a motor (S150), determining a stall state and stopping the motor (S160), and changing the target position to an initial position (S170), In this case, operations S140 and S150 are not in a time-series order with operations S160 and S170, and the present invention is not necessarily limited to the above order.

Figure 20:
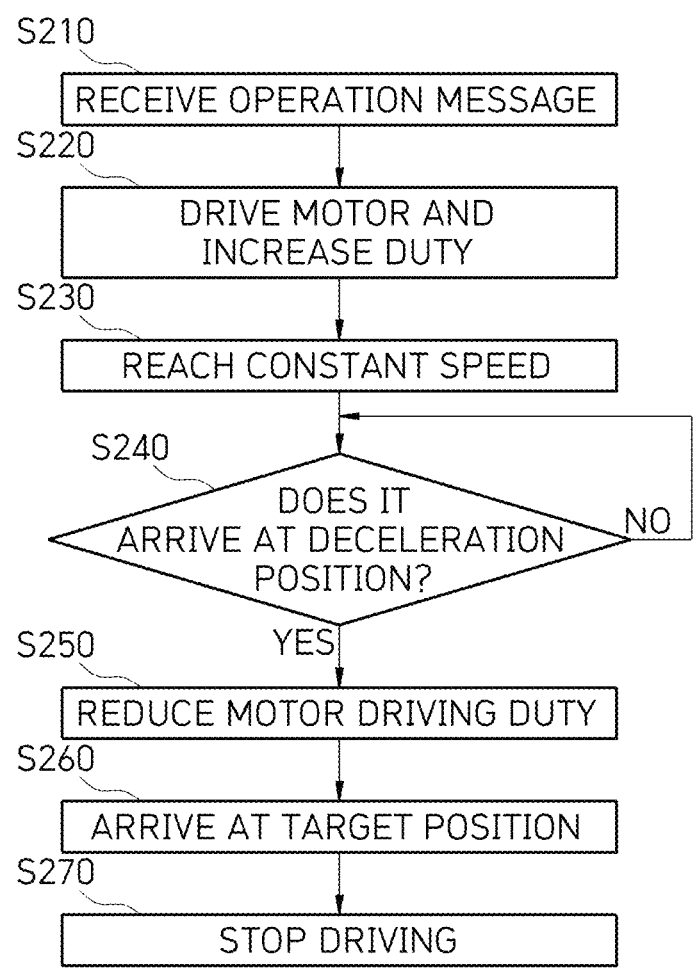
FIG. 20 is a flowchart illustrating an operation sequence in which a logic for reducing noise of the vehicle display device according to yet another embodiment of the present invention is applied.

FIG. 20 is a flowchart illustrating an operation sequence in which a logic for reducing noise of the vehicle display device according to one embodiment of the present invention is applied.

Referring to FIG. 20, according to the present invention, during a movement operation of a display, a logic for smoothly starting and stopping is applied so that a smooth movement operation may be implemented and noise may be reduced.

The method of controlling a vehicle display device, to which a logic for reducing noise is applied, includes receiving an operation message (S210), driving a motor and increasing a duty (S220), directing the motor to reach a constant speed (S230), directing the vehicle display device to arrive at a deceleration position (S240), reducing a motor driving duty (S250), directing the vehicle display device to arrive at a target position (S260), and stopping driving of the motor (S270).

FIG. 21 is a diagram in which an operation scenario of the vehicle display device according to one embodiment of the present invention is schematically summarized.

Referring to FIG. 21, the vehicle display device is moved to a driver's seat or a passenger seat in response to a movement signal from an integrated controller, and a display maintains a moved position or returns to an initial position according to transmission and reception of signals.

Meanwhile, DRV means the driver's seat, and PASS means the passenger seat.

Meanwhile, the method of controlling a vehicle display device according to the embodiment of the present invention may be implemented in a computer system or may be recorded in a recording medium. The computer system may include one or more processors, a memory, a user input device, a data communication bus, a user output device, and a storage. Each of the above-described components performs data communication via the data communication bus.

The computer system may further include a network interface coupled to a network. The processor may be a central processing unit (CPU) or a semiconductor device which processes commands stored in the memory and/or the storage.

The memory and the storage may include various forms of volatile or nonvolatile storage media. For example, the memory may include a read only memory (ROM) and a random access memory (RAM).

Therefore, the method of controlling a vehicle display device according to the embodiment of the present invention may be implemented in a computer-executable method. When the method of controlling a vehicle display device according to the embodiment of the present invention is performed in a computer device, computer-readable commands may perform the method of controlling a vehicle display device according to the present invention.

Meanwhile, the above-described method of controlling a vehicle display device according to the present invention may be implemented as a computer-readable code in a computer-readable recording medium. The computer-readable recording medium includes all kinds of recording media storing data which are decipherable by the computer system.

For example, there may be a ROM, a RAM, a magnetic tape, a magnetic disk, a flash memory, an optical data storage device, and the like. Further, the computer-readable recording medium may be distributed in a computer system connected to a computer network and may be stored and executed as a code readable in a distributed manner.

In accordance with the embodiments of the present invention, a touch operation system provides a different haptic feeling for each display region and each function which are targets to be controlled, and thus a driver can intuitively and accurately recognize whether a touch command is being input according to an intent of the driver so that there is an effect of improving convenience and preventing a field of view of the driver from being broken up.

The effects of the present invention are not limited to the above-mentioned effects, and other effects not mentioned above can be clearly understood by those skilled in the art from the foregoing description.

The embodiments of the present invention have been described. It can be understood by those skilled in the art to which the present invention pertains that the present invention can be implemented in modified forms without departing from the essential feature of the present invention. Therefore, the disclosed embodiments should be considered as illustrative rather than determinative. The scope of the present invention is defined by the appended claims rather than by the foregoing description, and all differences within the scope of equivalents thereof should be construed as being included in the present invention.

What is claimed is:

1. A system for controlling a display of a vehicle, the display including one or more touch operation regions including a first touch operation region, the system comprising:
   an input part configured to detect a touch input from a user with respect to the display and generate a touch input signal indicative of the user's touch input with respect to the display;
   a processor; and
   a memory in communication with the processor and storing instructions that, when executed by the processor, cause the processor to control the system to perform:
      receiving, from the input part, a first touch input signal indicating the user's touch input with respect to the first touch operation region on the display;
      in response to receiving the touch input signal, providing a first haptic feedback corresponding to the first touch operation region or a function associated with the first touch operation region;
      receiving, from the input part, a second touch input signal indicating that the user has dragged the touch input to a limitation of the first touch operation region; and
      providing a second haptic feedback when the second touch input signal indicates that the dragged touch input arrives at the limitation of the first touch operation region.

2. The system of claim 1, wherein, for providing the first and second haptic feedbacks, the instructions, when executed by the processor, further cause the processor to control the system to perform adjusting a frequency and strength of a vibration such that the first and second haptic feedbacks provide different feels.

3. The system of claim 1, wherein, for providing the second haptic feedback, the instructions, when executed by the processor, further cause the processor to control the system to perform providing the second haptic feedback when the user interacts with the first touch operation region and the limitation of the first touch operation region.

4. The system of claim 1, wherein:
   the display is configured to be physically movable between a first location to a second location within the vehicle, and
   the instructions, when executed by the processor, further cause the processor to control the system to perform:
      in response to a movement of the display from the first location to the second location, changing segmentation of the one or more touch operation regions; and
      changing a haptic feedback for each touch operation region.

5. The system of claim 1, wherein, for providing the first and second haptic feedbacks, the instructions, when executed by the processor, further cause the processor to control the system to perform providing a haptic feedback of a corresponding preset feel according to a preselected function mode.

6. The system of claim 1, wherein, for providing the first and second haptic feedbacks, the instructions, when executed by the processor, further cause the processor to control the system to perform:
   analyzing the first and second touch input signals to determine an operation intention of the user; and
   providing the first and second haptic feedbacks corresponding to the determined operation intent of the user.

7. A method of operating a system for a display of a vehicle, the system including (1) an input part configured to detect a touch input from a user with respect to the display and generate a touch input signal indicative of the user's touch input with respect to the display and (2) a display including one or more touch operation regions including a first touch operation region, the method comprising:
   receiving, from the input part, a first touch input signal indicating the user's touch input with respect to the first touch operation region on the display;
   in response to receiving the touch input signal, providing a first haptic feedback corresponding to the first touch operation region or a function associated with the first touch operation region;
   receiving, from the input part, a second touch input signal indicating that the user has dragged the touch input to a limitation of the first touch operation region; and
   providing a second haptic feedback when the second touch input signal indicates that the dragged touch input arrives at the limitation of the first touch operation region.

8. The method of claim 7, wherein providing the first and second haptic feedbacks includes adjusting a frequency and strength of a vibration such that the first and second haptic feedbacks provide different feels.

9. The method of claim 7, wherein:
   the display is configured to physically movable between a first location to a second location within the vehicle, and
   the method further comprises:
      in response to a movement of the display from the first location to the second location, changing segmentation of the one or more touch operation regions; and
      changing a haptic feedback for each touch operation region.

10. The method of claim 7, wherein providing the first and second haptic feedbacks comprises providing a haptic feedback of a corresponding preset feel according to a preselected function mode.

11. The method of claim 7, wherein providing the first and second haptic feedbacks comprises:
   analyzing the first and second touch input signals to determine an operation intention of the user; and
   providing the first and second haptic feedbacks corresponding to the determined operation intent of the user.

12. The method of claim 7, wherein providing the second haptic feedback comprises providing the second haptic feedbacks when the user interacts with the first touch operation region and the limitation of the first touch operation region.

* * * * *